(12) United States Patent
Wang et al.

(10) Patent No.: US 11,384,761 B2
(45) Date of Patent: Jul. 12, 2022

(54) VARIABLE CAPACITY COMPRESSOR

(71) Applicant: SHANGHAI HIGHLY ELECTRICAL APPLIANCES CO., LTD., Shanghai (CN)

(72) Inventors: Yanzhen Wang, Shanghai (CN); Jin Pan, Shanghai (CN); Chunhui Liu, Shanghai (CN)

(73) Assignee: SHANGHAI HIGHLY ELECTRICAL APPLIANCES CO., LTD., Shanghai (CN)

( * ) Notice: Subject to any disclaimer, the term of this patent is extended or adjusted under 35 U.S.C. 154(b) by 0 days.

(21) Appl. No.: 17/059,300

(22) PCT Filed: Dec. 27, 2019

(86) PCT No.: PCT/CN2019/129067
§ 371 (c)(1),
(2) Date: Nov. 27, 2020

(87) PCT Pub. No.: WO2020/211450
PCT Pub. Date: Oct. 22, 2020

(65) Prior Publication Data
US 2022/0025887 A1    Jan. 27, 2022

(30) Foreign Application Priority Data

Apr. 17, 2019 (CN) .......................... 201910308314.0

(51) Int. Cl.
*F01C 20/18* (2006.01)
*F03C 2/00* (2006.01)
(Continued)

(52) U.S. Cl.
CPC ............ *F04C 28/18* (2013.01); *F04C 18/356* (2013.01); *F04C 23/001* (2013.01); *F04C 28/24* (2013.01); *F04C 29/06* (2013.01)

(58) Field of Classification Search
CPC .... F04C 18/356; F04C 18/3562; F04C 23/00; F04C 23/001; F04C 23/008; F04C 28/18; F04C 28/24; F04C 29/06; F04C 29/12
See application file for complete search history.

(56) References Cited

U.S. PATENT DOCUMENTS

| 4,452,570 A | * | 6/1984 | Fujisaki | F04C 23/001 418/60 |
| 4,726,739 A | * | 2/1988 | Saitou | F04C 28/02 418/60 |

(Continued)

FOREIGN PATENT DOCUMENTS

| CN | 1603627 A | 4/2005 |
| CN | 1621692 A | 6/2005 |

(Continued)

OTHER PUBLICATIONS

The 1st Office Action dated Feb. 24, 2021 for CN patent application No. 201910308314.0.
The ISR dated Mar. 27, 2020 by the WIPO.

*Primary Examiner* — Theresa Trieu
(74) *Attorney, Agent, or Firm* — Qinghong Xu (57) ABSTRACT

A variable capacity compressor is provided, including: two cylinders and a middle plate; at least one flow channel provided in the middle plate, wherein one end of the flow channel is connected to an exhaust chamber of any one of the two cylinders, the other end is connected to a suction chamber of the other one of the two cylinders. In present disclosure, by setting a flow channel in the middle plate of the variable capacity compressor, the exhaust chamber of one cylinder is connected to the suction chamber of the other cylinder. When the flow channel is completely closed, the two cylinders operate independently; when the flow channel is opened, the refrigerant in the exhaust chamber flows into the suction chamber through the flow channel, that is, the upper cylinders and the lower cylinder are connected to each other, which can adjust the capacity of the compressor.

11 Claims, 6 Drawing Sheets

(51) Int. Cl.
  *F03C 4/00*    (2006.01)
  *F04C 2/00*    (2006.01)
  *F04C 28/18*   (2006.01)
  *F04C 18/356*  (2006.01)
  *F04C 23/00*   (2006.01)
  *F04C 28/24*   (2006.01)
  F04C 29/06     (2006.01)

(56) References Cited

U.S. PATENT DOCUMENTS

| | | | | |
|---|---|---|---|---|
| 5,152,156 | A | | 10/1992 | Tokairin |
| 5,322,424 | A | * | 6/1994 | Fujio ............... F04C 23/001 418/11 |
| 5,775,882 | A | * | 7/1998 | Kiyokawa ............ F04C 23/001 418/11 |
| 2005/0069422 | A1 | * | 3/2005 | Lee ................... F04C 23/001 418/11 |

FOREIGN PATENT DOCUMENTS

| | | | | |
|---|---|---|---|---|
| CN | 1769710 | A | | 5/2006 |
| CN | 103185166 | A | * | 7/2013 |
| CN | 103244413 | A | | 8/2013 |
| JP | S6270686 | A | | 4/1987 |
| JP | S63191287 | U | | 12/1988 |
| JP | H04166694 | A | | 6/1992 |
| JP | H04187892 | A | | 7/1992 |
| JP | H0735071 | A | | 2/1995 |
| JP | 2013104368 | A | | 5/2013 |

\* cited by examiner

VARIABLE CAPACITY COMPRESSOR

CROSS-REFERENCE TO RELATED APPLICATIONS

This application is based upon PCT patent application No. PCT/CN2019/129067, filed Dec. 27, 2019, which claims priority to Chinese Patent Application No. 201910308314.0, filed Apr. 17, 2019, the entire contents of which are incorporated herein by reference.

TECHNICAL FIELD

The present disclosure generally relates to the fields of a compressor, and more particularly, to a variable capacity compressor.

BACKGROUND

Nowadays, air conditioners are used more and more frequently. In order to improve the quality of life, the air conditioner will also be turned on in spring and autumn. When the air conditioner is used in spring and autumn, a temperature difference between indoor and outdoor is small, and a load of the air conditioner is lighter. However, in winter, users hope that the air conditioner can blow out hot air as soon as they arrive at home, that is, the air conditioner can operate at a heavy load. If both rapid heating in winter and operation at a very small load in spring and autumn are required for the air conditioner, the compressor must have the above two characteristics, which means that a capacity (volume flow) of the compressor can be varied according to the load. The capacity of the compressor used in the traditional air conditioner is fixed and immutable. Instead, the load of the air conditioner can be varied through frequency conversion technology, changing input current or digital scroll technology. However, the former technology is unable to meet the temperature control requirements of the four seasons, and the latter is gradually abandoned due to technical defects such as fluctuating noise, frequent switching noise of electronic expansion valves, and pulse noise of refrigerant flow. Therefore, it is necessary to design a compressor with its own variable capacity to meet a larger load variation range and realize the load variation of the air conditioner.

SUMMARY

In view of the problems of the existing technology, the object of the present disclosure is providing a variable capacity compressor.

In the present disclosure, by setting a flow channel in a middle plate of the variable capacity compressor, an exhaust chamber of one cylinder is connected to a suction chamber of the other cylinder, and the flow channel is provided with a flow control component for controlling flow rate of refrigerant within. The above technical solution enables the capacity of the variable capacity compressor to be variable, which will meet the requirements of variation loads of the compressor in different seasons.

When the temperature difference between indoor and outdoor is small, the flow channel is opened and the refrigerant in the exhaust chamber flows into the suction chamber through the flow channel, that is, an upper cylinder and a lower cylinder are connected to each other, which reduces the overall displacement volume (capacity) of the compressor and the compressor can operate at partial load.

When the temperature difference between indoor and outdoor is large, the flow channel is completely closed and the two cylinders operate independently. Compared with when the flow channel is opened, the capacity of the compressor is increased and the compressor can operate at full load.

In some embodiments of the present disclosure, a variable capacity compressor is provided. The variable capacity compressor includes: two cylinders; a middle plate, separating the two cylinders, and at least one flow channel provided in the middle plate, wherein one end of the flow channel is connected to an exhaust chamber of any one of the two cylinders, the other end of the flow channel is connected to a suction chamber of the other one of the two cylinders; each flow channel is provided with a flow control component for adjusting flow rate of refrigerant flowing through the flow channel.

Furthermore, the flow control component comprises a first slider provided in the middle plate, and the first slider is capable of moving along a radial direction of the middle plate to change an effective flow area of the flow channel, which adjusts the flow rate of the refrigerant flowing through the flow channel.

Furthermore, the first slider is driven by a solenoid valve, so that the first slider moves along the radial direction of the middle plate.

Furthermore, wherein a first end of the first slider is provided with a compression spring, and a second end of the first slider is connected to a valve core of the solenoid valve.

Furthermore, one end of the first slider is connected to a valve core of the solenoid valve.

Furthermore, the middle plate is provided with a radial sliding channel, the first slider is provided in the radial sliding channel, and one end of the radial sliding channel away from a center of the middle plate is provided with a pressure chamber; the pressure chamber is connected to a high pressure air passage and a low pressure air passage, pressure of gas introduced into the pressure chamber by the high pressure air passage is higher than that of gas introduced into the pressure chamber by the low pressure air passage, and the pressure chamber is provided with a second slider for blocking the high pressure air passage or the low pressure air passage; when the second slider blocks the low pressure air passage, gas in the high pressure air passage pushes the first slider to slide toward the flow channel.

Furthermore, a compression spring is provided at one end of the first slider away from the pressure chamber; when the second slider blocks the high pressure air passage, the compression spring pushes the first slider to slide away from the flow channel.

Furthermore, the middle plate is provided with a radial sliding channel, the first slider is provided in the radial sliding channel, and one end of the radial sliding channel away from the center of the middle plate is provided with a low pressure chamber, and the other end of the radial sliding channel is provided with a high pressure chamber, pressure of gas in the high pressure chamber is higher than that in the low pressure chamber, a compression spring is provided in the low pressure chamber, one end of the compression spring abuts against the first slider; the gas in the high pressure chamber pushes the first slider to slide toward the low pressure chamber.

Furthermore, the middle plate is provided respectively with a high pressure air passage and a low pressure air passage, one end of the high pressure air passage is connected to the high pressure chamber, and one end of the low pressure air passage is connected to the low pressure chamber.

Furthermore, the flow channel is parallel to a thickness direction of the middle plate.

Furthermore, an angle between a line and a projection of a blade slot of the cylinder on an end surface of the cylinder is from 100° to 270°, wherein the line is defined as the a connecting line between a center of a projection of the flow channel on the end surface of any one of the two cylinders and a center of the end surface of the cylinder.

Furthermore, the angle is ranging from 1700 to 220°.

Furthermore, the angle is ranging from 180° to 210°.

The above technical solutions have the following advantages:

In the present disclosure, by setting a flow channel in the middle plate of the variable capacity compressor, the exhaust chamber of one cylinder is connected to the suction chamber of the other cylinder, and the flow channel is provided with a flow control component for controlling the flow rate of the refrigerant within. The above technical solution enables the capacity of the variable capacity compressor of the present disclosure to be variable, which will meet the requirements of different loads of the compressor in different seasons.

When the temperature difference between indoor and outdoor is small, the flow channel is opened and the refrigerant in the exhaust chamber flows into the suction chamber through the flow channel, that is, the upper cylinders and the lower cylinder are connected to each other, which reduces the overall displacement volume (capacity) of the compressor and the compressor can operate at partial load.

When the temperature difference between indoor and outdoor is large, the flow channel is completely closed and the two cylinders operate independently. Compared with when the flow channel is opened, the capacity of the compressor is increased and the compressor can operate at full load.

Other features, advantages, as well as the structure and operation of various embodiments of the present disclosure, will be described in detail with reference to following drawings. It should be readily understood that the present disclosure is not limited to the specific embodiments described herein. The embodiments given herein are for illustrative purposes only.

BRIEF DESCRIPTION OF THE DRAWINGS

The foregoing and other features, and advantages of the present disclosure are apparent from the following detailed description taken in conjunction with the accompanying drawings in which.

REFERENCE SIGNS

11 upper cylinder cover
12 crankshaft
13 first cylinder
131 first exhaust chamber
132 first suction chamber
133 first rotating piston
134 blade slot
14 middle plate
141 flow channel
142 radial sliding channel
143 pressure chamber
144 high pressure air passage
145 low pressure air passage
146 high pressure chamber
147 low pressure chamber
144' high pressure air passage
145' low pressure air passage
second cylinder
151 second suction chamber
152 second exhaust chamber
153 second rotating piston
16 lower cylinder cover
21 solenoid valve
211 valve core
212 coil
22 flow control component
221 first slider
222 first compression spring
223 second compression spring
224 second slider The features and advantages of the disclosure are apparent from the following detailed description taken in conjunction with the accompanying drawing. Throughout the drawings, the same drawings identify corresponding elements. In the drawings, the same reference signs generally indicate the same, functionally similar, and/or structurally similar elements.

DETAILED DESCRIPTION

In the following, embodiments of the present disclosure will be described in detail with reference to the figures. The concept of the present disclosure can be implemented in a plurality of forms, and should not be understood to be limited to the embodiments described hereafter. In contrary, these embodiments are provided to make the present disclosure more comprehensive and understandable, and so the conception of the embodiments can be conveyed to those skilled in the art fully. Based on the embodiments of the present disclosure, all other embodiments obtained by those of ordinary skill in the art without creative work shall fall within the protection scope of the present disclosure.

The "first", "second" and similar words used in the present disclosure do not denote any order, quantity or importance, but are only used to distinguish different components. "comprise", "include" and other similar words mean that the elements or objects appearing before these words, the elements or objects listed after these words, and their equivalents, but other elements or objects are not excluded. Similar words such as "connected" are not limited to physical or mechanical connections, but may include electrical connections, whether direct or indirect. "up", "down", "left", "right", etc. are only used to indicate the relative position relationship. When the absolute position of the described object changes, the relative position relationship may also change accordingly.

It should be noted that the embodiments of the present disclosure and the features in the embodiments can be combined with each other if there is no conflict.

The present disclosure will be further explained below in conjunction with the drawings and specific embodiments, and the description should not be understood to be a limitation of the present disclosure.

Embodiment 1

In Embodiment 1 of the present disclosure, a variable capacity compressor is provided.

Figure 1:
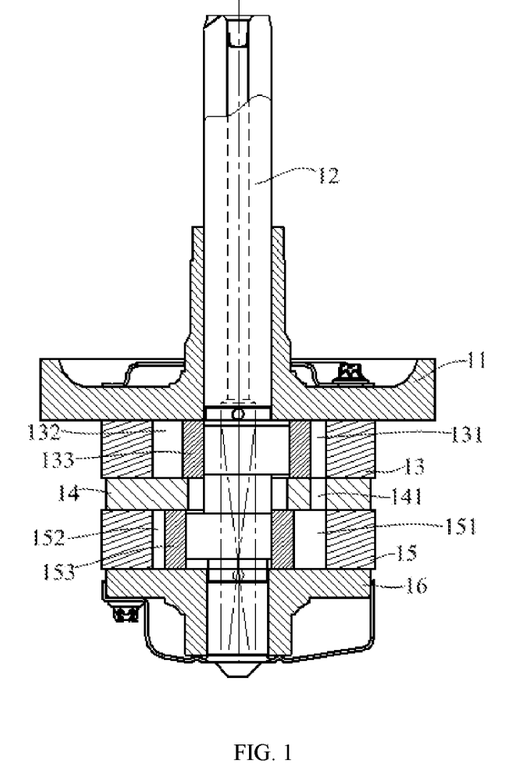
FIG. 1 is a schematic diagram of a structure of a compression assembly of the variable capacity compressor.

FIG. 1 is a schematic diagram of the structure of a compression assembly of the variable capacity compressor. The compression assembly shown in FIG. 1 has two cylinders, namely a first cylinder 13 and a second cylinder 15. The first cylinder 13 is located at an upper part, the second cylinder 15 is located at a lower part. The first cylinder 13 and the second cylinder 15 are separated by a middle plate 14. In this embodiment, the first cylinder 13 is the upper cylinder in this embodiment, and the second cylinder 15 is the lower cylinder. An upper part of the first cylinder 13 is provided with a upper cylinder cover 11, and a lower part of the second cylinder 15 is provided with a lower cylinder cover 16. The first cylinder 13 is provided with a first rotating piston 133, and the first rotating piston 133 divides the space in the first cylinder 13 into a first suction chamber 132 and a first exhaust chamber 131. The first rotating piston 133 is sleeved on the crankshaft 12, and the crankshaft 12 drives the first rotating piston 133 to rotate. With the rotation of the first rotating piston, the first suction chamber 132 inhales through a suction port, and the first exhaust chamber 131 exhausts compressed gas (refrigerant) through an exhaust vent connected thereto. The second cylinder 15 is provided with a second rotating piston 153, and the second rotating piston 153 divides the space in the second cylinder 15 into a second suction chamber 151 and a second exhaust chamber 152. The second rotating piston 153 is sleeved on the crankshaft 12, and the second rotating piston 153 is driven to rotate by the crankshaft 12. With the rotation of the second rotating piston, the second suction chamber 151 inhales through a suction port, and the second exhaust chamber 152 exhausts the compressed gas (refrigerant) through an exhaust vent connected thereto. The middle plate 14 is provided with a flow channel 141, the flow channel 141 penetrates the entire middle plate 14 and is parallel to a thickness direction of the middle plate 14. The flow channel 141 shown in FIG. 1 is connected to the first exhaust chamber 131 of the first cylinder 13 and the second suction chamber 151 of the second cylinder 15.

In some embodiments, the first exhaust chamber 131 of the first cylinder 13 is connected to the second suction chamber 151 of the second cylinder 15 through a flow channel 141, and the first suction chamber 132 of the first cylinder 13 is connected to the second suction chamber 151 through a flow channel 141.

Figure 2:
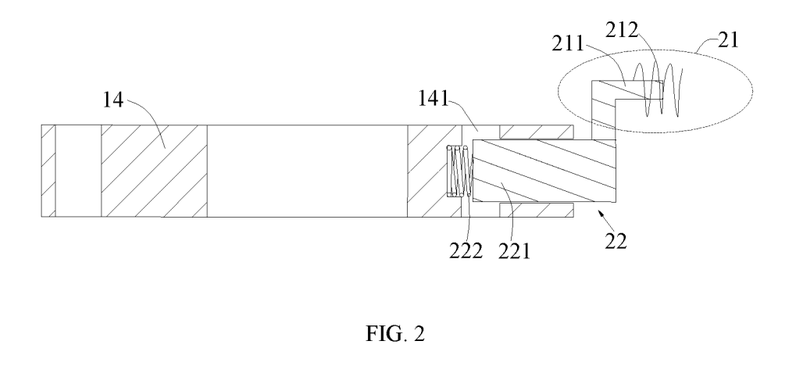
FIG. 2 is a cross-sectional drawing of the middle plate according to Embodiment 1.

FIG. 2 is a cross-sectional diagram of the middle plate according to Embodiment 1. The middle plate 14 shown in FIG. 2 is provided with a flow channel 141 which is parallel to the thickness direction of the middle plate 14. In addition, a flow control component 22 is provided in the flow channel 141 to adjust the flow rate of the refrigerant within. The flow control component 22 includes a first slider 221 and a first compression spring 222. The first slider 221 can move along a radial direction of the middle plate 14 to change an effective flow area of the flow channel 141, which adjusts the flow rate of the refrigerant flowing through the flow channel 141. Wherein the effective flow area is a minimum cross-sectional area of the flow channel 141. When the first slider 221 slides toward a center of the middle plate 14, it can gradually block the flow channel 141, which reduces the effective flow area of the flow channel 141 until the flow channel 141 is closed completely. When the first slider 221 blocks (closes) the flow channel 141, the first cylinder 13 and the second cylinder 15 work independently. The sliding of the first slider 221 is driven by a solenoid valve 21. A first end of the first slider 221 is provided with a first compression spring 222, and a second end of the first slider 221 is connected to a valve core 211 of the solenoid valve 21. The valve core 211 can slide along the radial direction of the middle plate 14 driven by the coil 212. Accordingly the valve core 211 can drive the first slider 221 to slide along the radial direction of the middle plate 14. When the flow channel 141 is fully or partly opened, the refrigerant in the exhaust chamber 131 flows into the suction chamber 151 through the flow channel 141, that is, the upper cylinder and the lower cylinder are connected to each other, which reduces the overall displacement volume (capacity) of the compressor and the compressor can operate at partial load. When the flow channel 141 is completely closed, the two cylinders 13 and 15 operate independently. Compared with when the flow channel 141 is opened, the capacity of the compressor is increased and the compressor can operate at full load.

Figure 3:
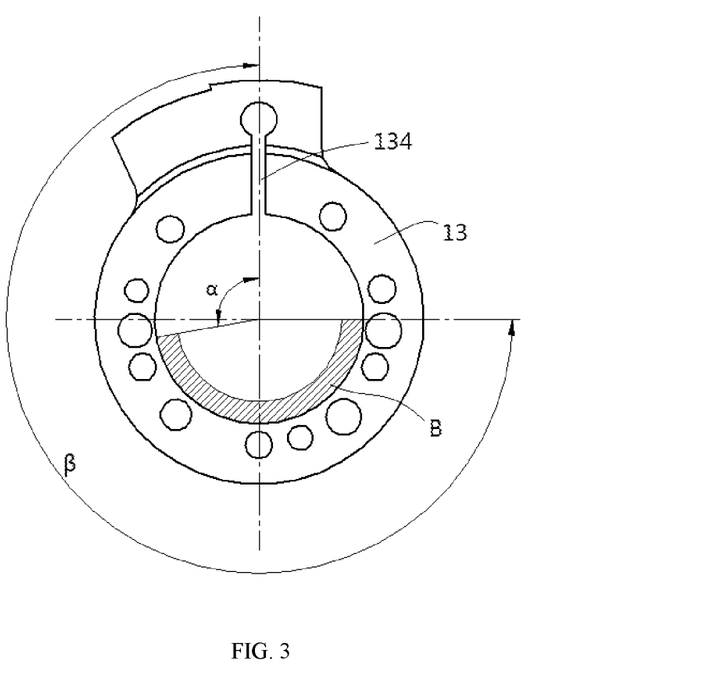
FIG. 3 is a schematic diagram of a location of a flow channel.

FIG. 3 is a schematic diagram of the location of a flow channel, and shows a top view of the first cylinder 13. A projection of the flow passage 141 on an end surface of the first cylinder 13 is located in an area B. A coverage angle of area B is ranging from a to p, where α is 100 degrees, β is 270 degrees, and a center of the blade slot 134 is 0 degree, that is, the angle between a line and the projection of the blade slot of the cylinder on the end surface of the cylinder is ranging from 100° to 270°, wherein the line is defined as a connecting line between a center of the projection of the end surface of any cylinder and a center of the end surface of the cylinder. In some embodiments, α is 170 degrees and β is 220 degrees; alternatively, α is 180 degrees and β is 210 degrees. An opening of the flow channel 141 is located between an inner wall of the cylinder and an outer wall of the rotary piston, and an inner diameter of the flow channel 141 is smaller than a wall thickness of any one of the rotary pistons to prevent gas leakage from the first cylinder 13 or the second cylinder 15.

Embodiment 2

Figure 4:
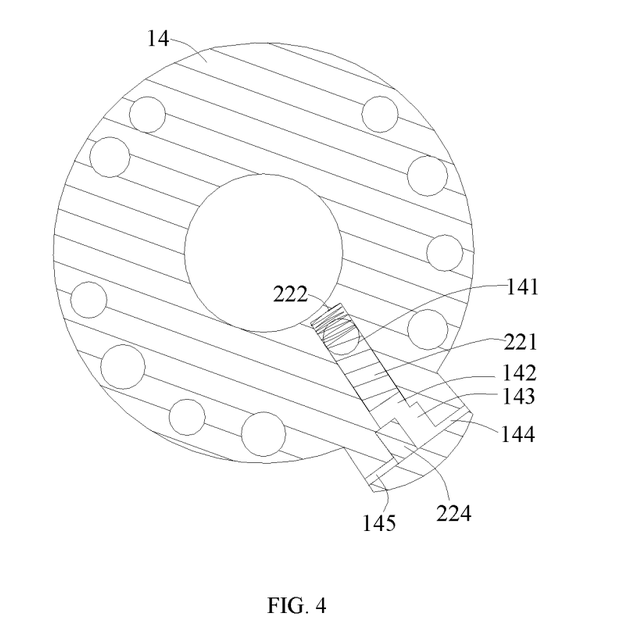
FIG. 4 is a schematic diagram of a middle plate according to Embodiment 2.

FIG. 4 is a schematic diagram of the middle plate according to Embodiment 2. Embodiment 2 provides a variable capacity compressor. The difference between the variable capacity compressor in Embodiment 2 and Embodiment 1 is that the middle plate 14 is provided with a radial sliding channel 142, and the first slider 221 is provided in the radial sliding channel 142. One end of the radial sliding channel 142 away from the center of the middle plate 14 is provided with a pressure chamber 143. The pressure chamber 143 is connected respectively to a high pressure air passage 144 and a low pressure air passage 145, pressure of gas introduced into the pressure chamber 143 by the high pressure air passage 144 is higher than that of gas introduced into the pressure chamber 143 by the low pressure air passage 145. The pressure chamber 143 is provided with a second slider 224 for blocking the high pressure air passage 144 or the low pressure air passage 145.

Figure 5:
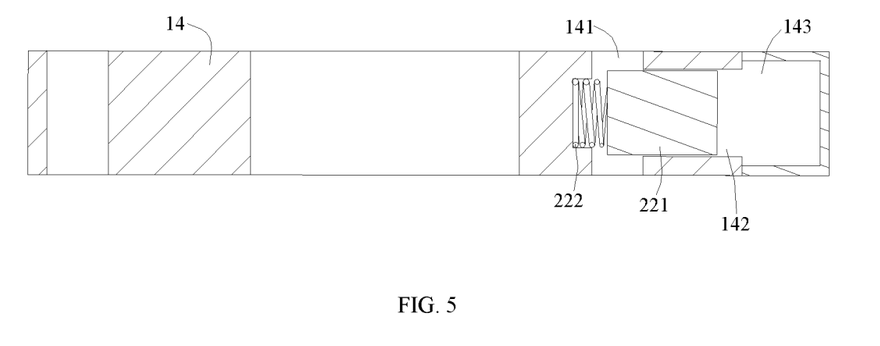
FIG. 5 is a schematic axial cross-sectional diagram of the middle plate in FIG. 4.

FIG. 5 is a schematic axial cross-sectional diagram of the middle plate in FIG. 4. Referring to FIGS. 4 and 5, the radial sliding channel 142 in the middle plate 14 is provided along the radial direction of the middle plate 14. Also, the radial sliding channel 142 intersects with the flow channel 141, and the first slider 221 is provided in the radial sliding channel 142. When the first slider 221 slides in the radial sliding channel 142, the effective flow area of the flow channel 141 is changed, thereby adjusting the flow rate of the refrigerant flowing through the flow channel 141. One end (second end) of the pressure chamber 143 away from the center of the middle plate 14 is connected to the radial sliding channel 142. One end (first end) of the first slider 221 away from the pressure chamber 143 is provided with a compression spring. The pressure chamber 143 is connected respectively to a high pressure air passage 144 and a low pressure air passage 145, and pressure of gas introduced into the pressure chamber 143 by the high pressure air passage 144 is higher than that of gas introduced into the pressure chamber 143 by the low pressure air passage 145. The pressure chamber 143 is provided with a second slider 224 for blocking the high pressure air passage 144 or the low pressure air passage 145. High pressure gas outside the middle plate 14 can enter the pressure chamber 143 through the high pressure gas passage 144. The low pressure gas passage 145 is connected to the suction port (not shown in the figures) of the first cylinder 13 or the second cylinder 15 so that low pressure gas can be introduced into the low pressure chamber 145 through the suction port. The cross section of the pressure chamber 143 is in a shape of a rectangle, and the second slider 224 slides along a length direction of the rectangle. When the second slider 224 slides to a side of the low pressure air passage 145, the second slider 224 blocks the low pressure air passage 145, and the gas (high pressure gas) in the high pressure air passage 144 pushes the first slider 221 toward the flow channel 141, that is, the flow channel 141 is closed. When the second slider 224 slides toward the high pressure air passage 144, the second slider 224 blocks the high pressure air passage 144, and the compression spring drives the first slider 221 away from the flow channel 141, thereby, the flow channel 141 is opened and the refrigerant in the exhaust chamber can flow into the suction chamber. In some embodiments, the sliding of the second slider 224 may be driven by a solenoid valve.

Embodiment 3

Figure 6:
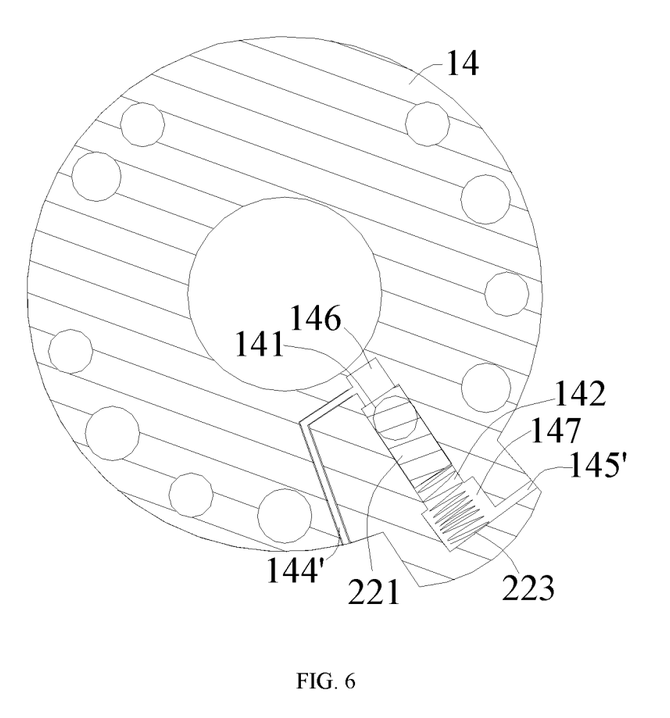
FIG. 6 is a schematic diagram of the middle plate according to Embodiment 3.

FIG. 6 is a schematic diagram of the middle plate in Embodiment 3. The difference between the variable capacity compressor in Embodiment 3 and Embodiment 1 is that the middle plate 14 is provided with a radial sliding channel 142 and the first slider 221 is provided in the radial sliding channel 142. One end of the radial sliding channel 142 away from the center of the middle plate 14 is provided with a low pressure chamber 147, and the other end of the radial sliding channel 142 is provided with a high pressure chamber 146. Gas of pressure in the high pressure chamber 146 is higher than that in the low pressure chamber 147. A compression spring 223 is provided in the low pressure chamber 147, one end of the compression spring 223 abuts against the first slider 221. The middle plate 14 is provided respectively with a high pressure air passage 144' and a low pressure air passage 145', one end of the high pressure air passage 144' is connected to the high pressure chamber 146, and one end of the low pressure air passage 145' is connected to the low pressure chamber 147. Pressure of gas introduced into the high pressure chamber 146 by the high pressure air passage 144' is higher than that of gas introduced into the low pressure chamber 147 by the low pressure air passage 145', so that the high pressure gas outside the middle plate 14 can enter the high pressure chamber 146 through the high pressure gas passage 144'. The low pressure gas passage 145' is connected to the suction port (not shown in the figure) of the first cylinder 13 or the second cylinder 15 so that the low pressure gas can be introduced into the low pressure chamber 147 through the suction port. The high pressure gas in the high pressure chamber 146 pressures on the first slider 221, and the low pressure gas in the low pressure chamber 147 pressures on the first slider 221. When a combined force of the two pressures is greater than a pressure exerted by the second compression spring 223 on the first slide, the first slider 221 slides toward the low pressure chamber 147, and the flow channel 141 is opened; on the contrary, the first slider 221 slides toward the high pressure chamber 146, the flow channel 141 is closed.

In summary, in the present disclosure, by setting a flow channel in the middle plate of the variable capacity compressor, the exhaust chamber of one cylinder is connected to the suction chamber of the other cylinder, and the flow channel is provided with a flow control component for controlling the flow rate of the refrigerant within. The above technical solution enables the capacity of the variable capacity compressor of the present disclosure to be variable, which will meet the requirements of different loads of the compressor in different seasons.

When the temperature difference between indoor and outdoor is small, the flow channel is opened and the refrigerant in the exhaust chamber flows into the suction chamber through the flow channel, that is, the upper cylinders and the lower cylinder are connected to each other, which reduces the overall displacement volume (capacity) of the compressor and the compressor can operate at partial load.

When the temperature difference between indoor and outdoor is large, the flow channel is completely closed and the two cylinders operate independently. Compared with when the flow channel is opened, the capacity of the compressor is increased and the compressor can operate at full load.

The preferred embodiments of the present disclosure have been described in detail above. It should be understood that those skilled in the art can make many modifications and changes according to the concept of the present disclosure without creative work. Therefore, any technical solution that can be obtained by a person who skilled in art through logical analysis, reasoning, or limited experimentation based on the concept of the present disclosure on the basis of the prior art shall fall within the protection scope determined by the claims.

The invention claimed is:

1. A variable capacity compressor, comprising:
   two cylinders;
   a middle plate, separating the two cylinders, and at least one flow channel provided in the middle plate, wherein one end of the flow channel is connected to an exhaust chamber of any one of the two cylinders, the other end of the flow channel is connected to a suction chamber of the other one of the two cylinders; each flow channel is provided with a flow control component for adjusting flow rate of refrigerant flowing through the flow channel;
   wherein the flow control component comprises a first slider, and the first slider moves along a radial direction of the middle plate to change an effective flow area of the flow channel;
   the middle plate is provided with a radial sliding channel, the first slider is provided in the radial sliding channel, and one end of the radial sliding channel away from a center of the middle plate is provided with a pressure chamber; the pressure chamber is connected to a high pressure air passage and a low-pressure air passage, pressure of gas introduced into the pressure chamber by the high pressure air passage is higher than that of gas introduced into the pressure chamber by the low pressure air passage, and the pressure chamber is provided with a second slider for blocking the high pressure air passage or the low pressure air passage;

when the second slider blocks the low pressure air passage, gas in the high pressure air passage pushes the first slider to slide toward the flow channel.

2. The variable capacity compressor of claim 1, wherein the first slider is driven by a solenoid valve, so that the first slider moves along the radial direction of the middle plate.

3. The variable capacity compressor of claim 2, wherein a first end of the first slider is provided with a compression spring, and a second end of the first slider is connected to a valve core of the solenoid valve.

4. The variable capacity compressor of claim 2, wherein one end of the first slider is connected to a valve core of the solenoid valve.

5. The variable capacity compressor of claim 1, wherein a compression spring is provided at one end of the first slider away from the pressure chamber;

when the second slider blocks the high pressure air passage, the compression spring pushes the first slider to slide away from the flow channel.

6. The variable capacity compressor of claim 1, wherein the flow channel is parallel to a thickness direction of the middle plate.

7. The variable capacity compressor of claim 1, wherein an angle between a line and a projection of a blade slot of the cylinder on an end surface of the cylinder is from 100° to 270°, wherein the line is defined as a connecting line between a center of a projection of the flow channel on the end surface of any one of the two cylinders and a center of the end surface of the cylinder.

8. The variable capacity compressor of claim 7, wherein the angle is ranging from 170° to 220°.

9. The variable capacity compressor of claim 8, wherein the angle is ranging from 180° to 210°.

10. A variable capacity compressor, comprising:
two cylinders;
a middle plate, separating the two cylinders, and at least one flow channel provided in the middle plate, wherein one end of the flow channel is connected to an exhaust chamber of any one of the two cylinders, the other end of the flow channel is connected to a suction chamber of the other one of the two cylinders; each flow channel is provided with a flow control component for adjusting flow rate of refrigerant flowing through the flow channel;
wherein the flow control component comprises a first slider, and the first slider moves along a radial direction of the middle plate to change an effective flow area of the flow channel;
the middle plate is provided with a radial sliding channel, the first slider is provided in the radial sliding channel, and one end of the radial sliding channel away from a center of the middle plate is provided with a low pressure chamber, and the other end of the radial sliding channel is provided with a high pressure chamber, pressure of gas in the high pressure chamber is higher than that in the low pressure chamber, a compression spring is provided in the low pressure chamber, one end of the compression spring abuts against the first slider; the gas in the high pressure chamber pushes the first slider to slide toward the low pressure chamber.

11. The variable capacity compressor of claim 10, wherein the middle plate is provided respectively with a high pressure air passage and a low pressure air passage, one end of the high pressure air passage is connected to the high pressure chamber, and one end of the low pressure air passage is connected to the low pressure chamber.

* * * * *